(12) United States Patent
Nekozuka

(10) Patent No.: US 12,057,015 B2
(45) Date of Patent: Aug. 6, 2024

(54) ELECTRONIC DEVICE, CONTROL METHOD OF ELECTRONIC DEVICE, AND CONTROL PROGRAM OF ELECTRONIC DEVICE

(71) Applicant: KYOCERA Corporation, Kyoto (JP)

(72) Inventor: Hikaru Nekozuka, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 619 days.

(21) Appl. No.: 17/287,387

(22) PCT Filed: Oct. 7, 2019

(86) PCT No.: PCT/JP2019/039522
§ 371 (c)(1),
(2) Date: Apr. 21, 2021

(87) PCT Pub. No.: WO2020/085065
PCT Pub. Date: Apr. 30, 2020

(65) Prior Publication Data
US 2021/0390861 A1 Dec. 16, 2021

(30) Foreign Application Priority Data
Oct. 26, 2018 (JP) .................. 2018-201932

(51) Int. Cl.
*G08G 1/16* (2006.01)
(52) U.S. Cl.
CPC .................. *G08G 1/166* (2013.01)
(58) Field of Classification Search
None
See application file for complete search history.

(56) References Cited

U.S. PATENT DOCUMENTS

| | | | | |
|---|---|---|---|---|
| 5,280,239 A | * | 1/1994 | Klimovitsky | G01D 5/2046 324/207.17 |
| 5,394,292 A | * | 2/1995 | Hayashida | H03K 17/955 340/904 |
| 6,051,981 A | * | 4/2000 | Gershenfeld | H03K 17/955 324/687 |
| 6,348,862 B1 | * | 2/2002 | McDonnell | B60N 2/2863 340/561 |
| 6,600,896 B2 | | 7/2003 | Chadwick et al. | |
| 7,392,013 B2 | | 6/2008 | Chadwick et al. | |

(Continued)

FOREIGN PATENT DOCUMENTS

| | | |
|---|---|---|
| CN | 1656717 A | 8/2005 |
| JP | 2006010570 A  * | 1/2006 |

(Continued)

*Primary Examiner* — Peter D Nolan
*Assistant Examiner* — Jacob Kent Besteman-Street
(74) *Attorney, Agent, or Firm* — Studebaker & Brackett PC

(57) ABSTRACT

An electronic device is configured to be installed in a mobile body. The electronic device comprises an electric field generator, an electric field detector, and a controller. The electric field generator is configured to generate an electric field in a predetermined range. The electric field detector is configured to detect the electric field generated by the electric field generator. The controller is configured to detect an object in the predetermined range based on a change of the electric field detected by the electric field detector. The controller is configured to control the mobile body based on a result of detecting the object.

5 Claims, 5 Drawing Sheets

(56) References Cited

U.S. PATENT DOCUMENTS

| | | | | |
|---|---|---|---|---|
| 7,397,351 B1* | 7/2008 | Rubin | ............ | B60Q 9/008 |
| | | | | 340/436 |
| 8,279,077 B1 | 10/2012 | Liff et al. | | |
| 2002/0142716 A1 | 10/2002 | Chadwick et al. | | |
| 2004/0233048 A1* | 11/2004 | Luna | ............ | G08G 1/166 |
| | | | | 340/551 |
| 2007/0139175 A1* | 6/2007 | Servera Serapio | .... | G08G 1/167 |
| | | | | 340/435 |
| 2009/0066346 A1 | 3/2009 | Kaltner | | |
| 2011/0156890 A1* | 6/2011 | Aubry | ............ | G01V 3/088 |
| | | | | 340/435 |
| 2012/0237712 A1 | 9/2012 | Thielhorn | | |
| 2018/0335460 A1* | 11/2018 | Streett | ............ | G01V 3/088 |
| 2023/0243994 A1* | 8/2023 | Donderici | ............ | G01S 13/931 |
| | | | | 701/23 |

FOREIGN PATENT DOCUMENTS

| | | | |
|---|---|---|---|
| JP | 2006010570 A | | 1/2006 |
| JP | 2012237712 A | * | 12/2012 |
| JP | 2013115525 A | | 6/2013 |

\* cited by examiner

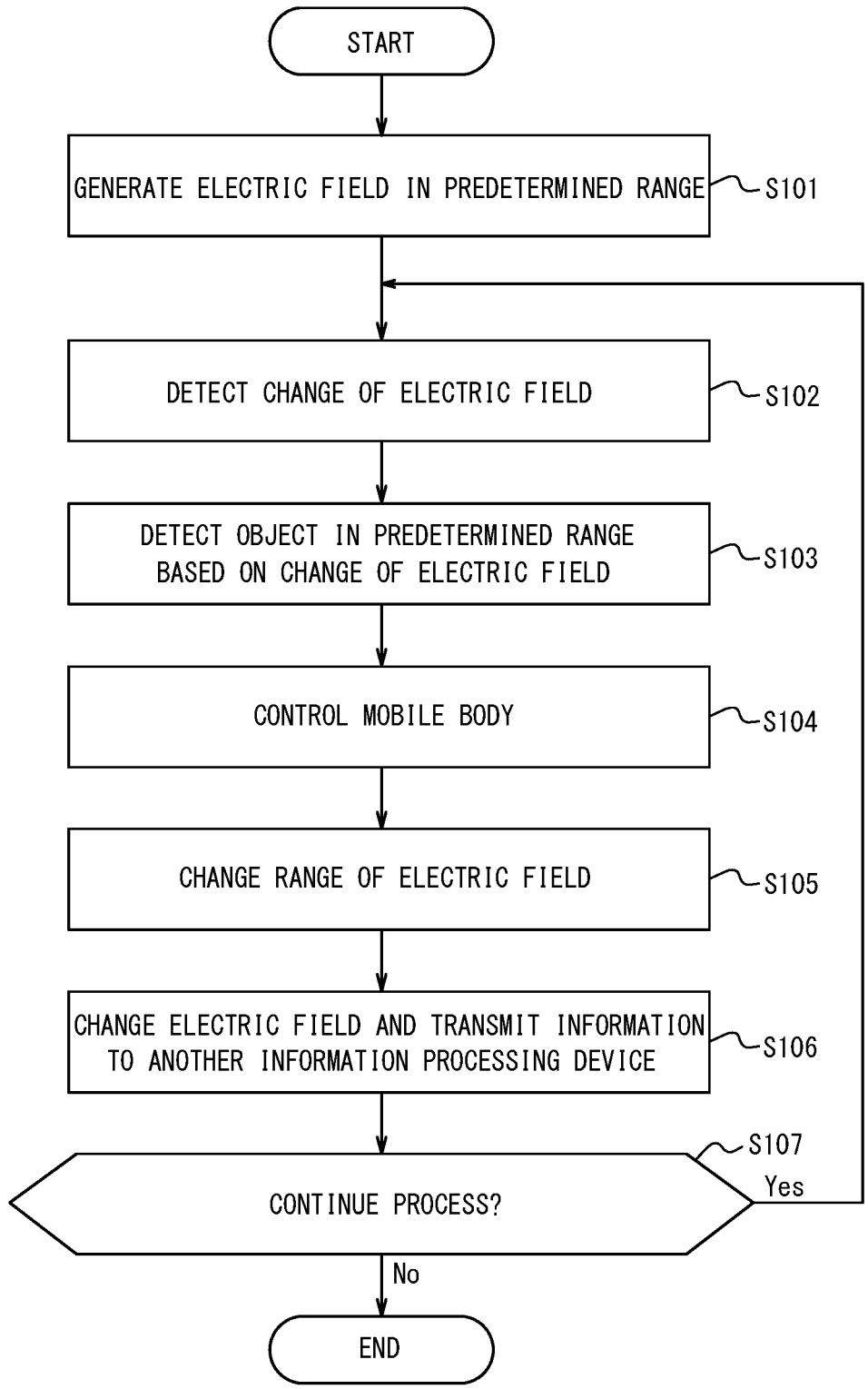

ELECTRONIC DEVICE, CONTROL METHOD OF ELECTRONIC DEVICE, AND CONTROL PROGRAM OF ELECTRONIC DEVICE

CROSS REFERENCE TO RELATED APPLICATION

This application claims priority to and the benefit of Japanese Patent Application No. 2018-201932 filed on Oct. 26, 2018, the entire disclosure of which is incorporated herein by reference.

TECHNICAL FIELD

The present disclosure relates to an electronic device, a control method of an electronic device, and a control program of an electronic device.

BACKGROUND

A technique of detecting an object by generating an electric field is conventionally known. For example, It is known a method of generating an electric field from a driving steering wheel during vehicle running to generate an electric field through the body of the driver gripping the steering wheel toward a mobile phone, thus restricting the use of the mobile phone.

SUMMARY

An electronic device according to one of the disclosed embodiments is configured to be installed in a mobile body. The electronic device comprises an electric field generator, an electric field detector, and a controller. The electric field generator is configured to generate an electric field in a predetermined range. The electric field detector is configured to detect the electric field generated by the electric field generator. The controller is configured to detect an object in the predetermined range based on a change of the electric field detected by the electric field detector. The controller is configured to control the mobile body based on a result of detecting the object.

A control method of an electronic device according to one of the disclosed embodiments is a control method of an electronic device installed in a mobile body. The control method comprises generating an electric field in a predetermined range. The control method comprises detecting the electric field generated. The control method comprises detecting an object in the predetermined range based on a change of the electric field detected. The control method comprises controlling the mobile body based on a result of detecting the object.

A control program of an electronic device according to one of the disclosed embodiments is a control program of an electronic device installed in a mobile body. The control program causes the electronic device to generate an electric field in a predetermined range. The control program causes the electronic device to detect the electric field generated. The control program causes the electronic device to detect an object in the predetermined range based on a change of the electric field detected. The control program causes the electronic device to control the mobile body based on a result of detecting the object.

BRIEF DESCRIPTION OF THE DRAWINGS

In the accompanying drawings:

FIG. 5 is a flowchart illustrating processing by the electronic device according to one of the disclosed embodiments.

DETAILED DESCRIPTION

It is desirable to further improve the usefulness of the technique of detecting an object using an electric field. It could therefore be helpful to provide an electronic device, a control method of an electronic device, and a control program of an electronic device that improve the usefulness of the technique of detecting an object using an electric field. With an electronic device, a control method of an electronic device, and a control program of an electronic device according to one of the disclosed embodiments, the usefulness of the technique of detecting an object using an electric field is improved.

One of the disclosed embodiments will be described in detail below, with reference to the drawings.

Figure 1:
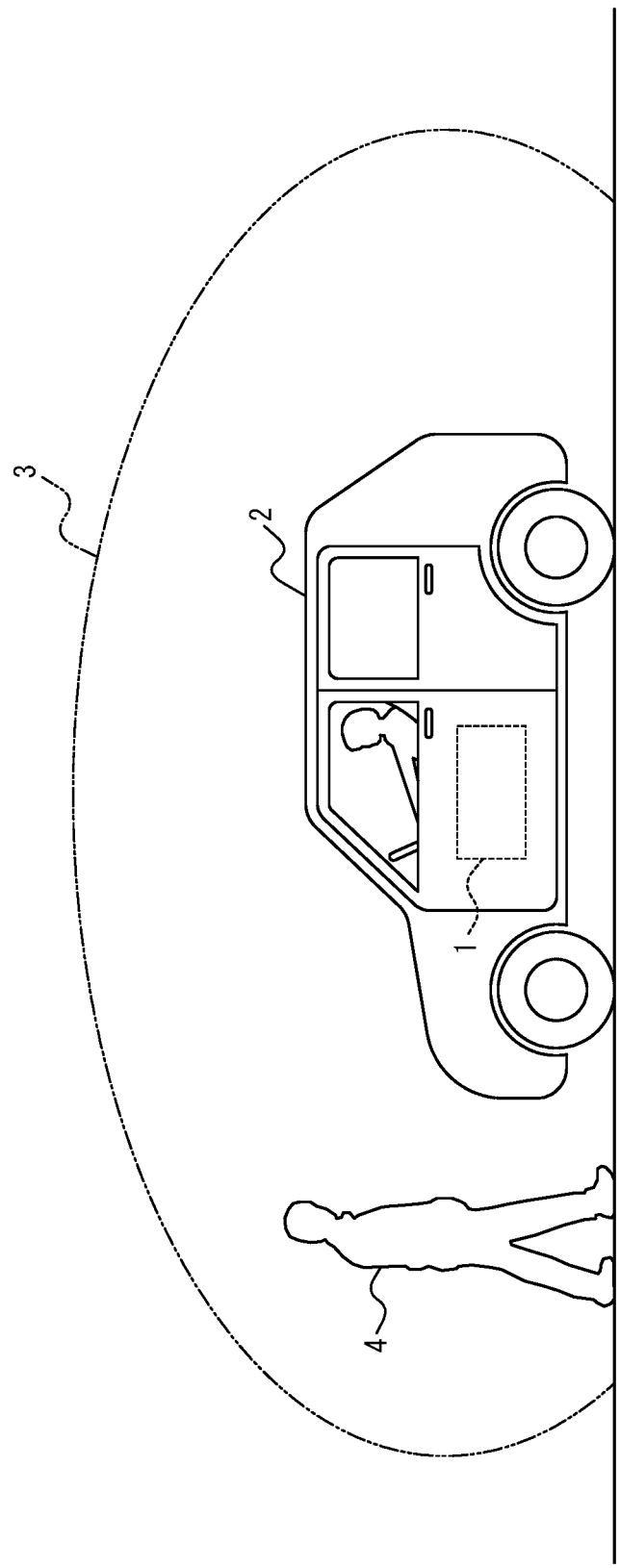
FIG. 1 is a diagram illustrating a use state of an electronic device according to one of the disclosed embodiments.

An electronic device 1 according to one of the disclosed embodiments is, for example, installed in a mobile body 2 such as an automobile. The electronic device 1 generates an electric field around the mobile body 2. The electric field may be, for example, a quasi-electrostatic field having a property of being distributed around an object and staying around the object. FIG. 1 schematically illustrates a distribution range 3 in which the electric field generated by the electronic device 1 is distributed, by a dashed-two dotted line. For example, in the case where an object 4 such as another mobile body, a person, or an obstacle enters the distribution range 3 of the electric field or moves in the distribution range 3 of the electric field as illustrated in FIG. 1, the electric field changes. The electronic device 1 detects the change of the generated electric field. Based on the detected change of the electric field, the electronic device 1 detects the object 4 existing in the distribution range 3 of the electric field, and performs control such as deceleration on the mobile body 2. In the present disclosure, the term "quasi-electrostatic field" denotes an electric field which has the distribution range sufficiently smaller than the wavelength, or an electric field that is around a living body or an object and changes in intensity.

Examples of the mobile body 2 include an automobile, a truck, a bus, a motorcycle, a ship, an aircraft, and a robot. The mobile body 2 is not limited to such, and may be any movable object. The mobile body may be an automatic driving mobile body that operates autonomously. Examples of the object 4 include another mobile body, a person, and an obstacle. The object 4 is not limited to such, and may be any object that can influence the electric field. For example, the object 4 may include a conductor such as a metal. In the case where the object 4 includes a conductor, the movement of free charges in the object 4 can influence the electric field.

The object 4 may include a dielectric such as plastic, glass, or ceramic. In the case where the object 4 includes a dielectric, the generation of charges at the surface of the object 4 can influence the electric field.

Figure 2:
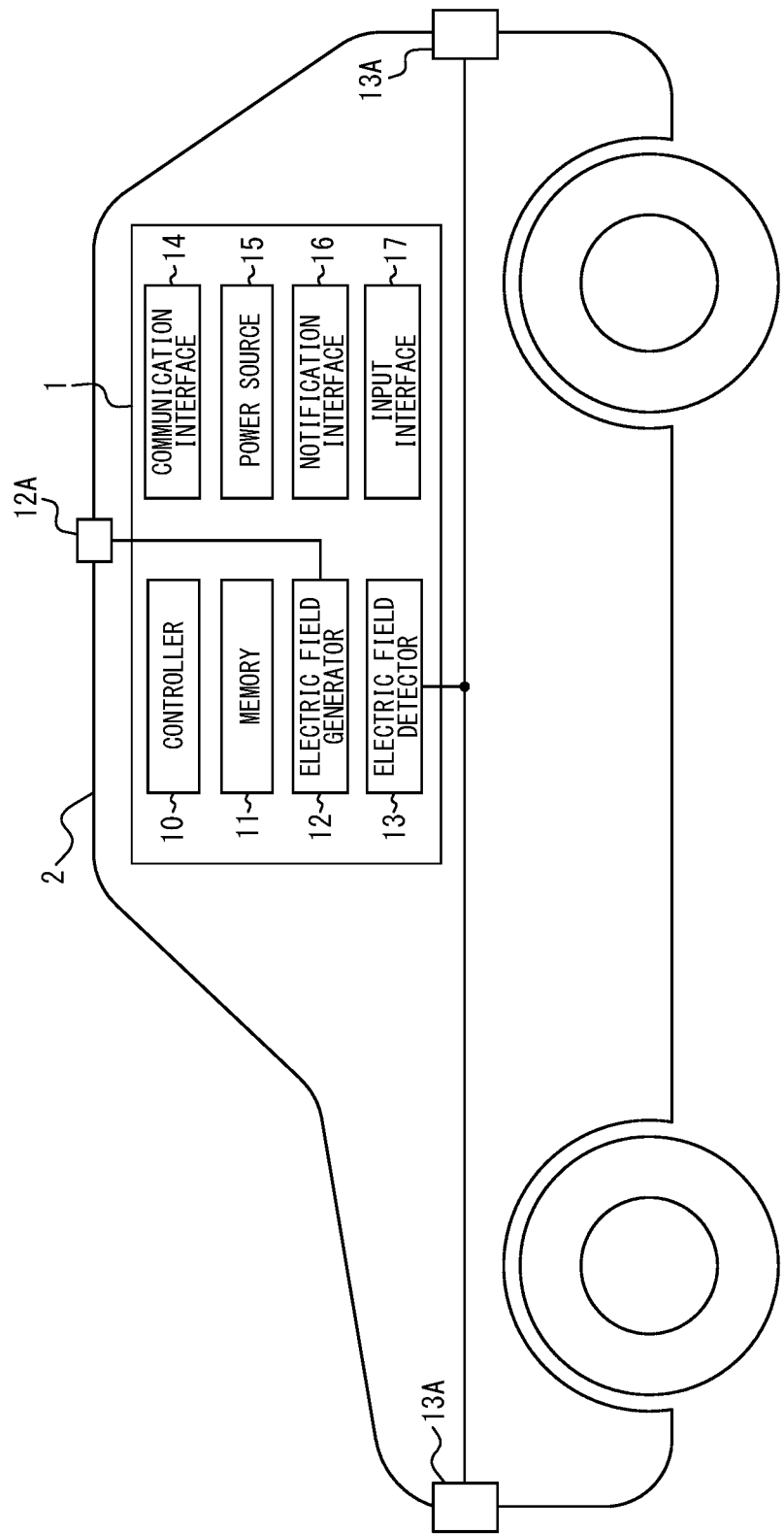
FIG. 2 is a schematic diagram illustrating the structure of the electronic device according to one of the disclosed embodiments.

The structure of the electronic device 1 according to one of the disclosed embodiments will be described below. The electronic device 1 may be any information processing device installed in the mobile body 2. The electronic device 1 may be installed integrally with the mobile body 2 or removably from the mobile body 2. FIG. 2 is a functional block diagram schematically illustrating the structure of the electronic device 1 according to one of the disclosed embodiments. As illustrated in FIG. 2, the electronic device 1 according to one of the disclosed embodiments includes a controller 10, a memory 11, an electric field generator 12, an electric field detector 13, a communication interface 14, a power source 15, a notification interface 16, and an input interface 17. The controller 10 is electrically connected to each of the memory 11, the electric field generator 12, the electric field detector 13, the communication interface 14, the power source 15, the notification interface 16, and the input interface 17. In FIG. 2, the electronic device 1 and the mobile body 2 are illustrated with a scale different from the actual scale, for explaining the structure of the electronic device 1.

The controller 10 includes at least one processor to provide control and processing capacity for achieving various functions. The controller 10 may control each of the below-described memory 11, electric field generator 12, electric field detector 13, communication interface 14, power source 15, notification interface 16, and input interface 17 to achieve their functions. The processor may include a processor such as a central processing unit (CPU) for executing a program defining a control procedure, or a dedicated processor specialized for specific processing. The processor may be implemented as a single integrated circuit (IC). The processor may be implemented as a plurality of integrated circuits and/or discrete circuits communicably connected to each other. The processor may be implemented based on any of other various known techniques. Processes by the controller 10 will be described in detail later.

The memory 11 stores information, programs, and the like used for processes for controlling the functions of the electronic device 1. Examples of the memory 11 include semiconductor memory, magnetic memory, and optical memory. The memory 11 may function, for example, as a main storage device or an auxiliary storage device. The memory 11 may be cache memory or the like included in the controller 10. The memory 11 may be a volatile storage device or a non-volatile storage device. In this embodiment, for example, the memory 11 may store information used to generate an electric field from the electric field generator 12, as described in detail later. The memory 11 may store information, etc. used to detect an object in a predetermined range based on a change of an electric field detected by the electric field detector 13.

The electric field generator 12 generates an electric field in a predetermined range. The predetermined range may be a range of a predetermined distance from the mobile body 2. The electric field generator 12 may include an electrode 12A for generating the electric field. The electric field generated by the electric field generator 12 may be a quasi-electrostatic field. The quasi-electrostatic field has a property of being distributed so as to stay around the electrode 12A without propagating through the air and repeating periodic changes. Using this property, the electric field generator 12 generates the quasi-electrostatic field around the mobile body 2 in which the electronic device 1 is installed. To generate the quasi-electrostatic field around the mobile body 2, the electrode 12A in the electric field generator 12 may be installed on the outer surface of the mobile body 2.

In an example, it is known that a quasi-electrostatic field is distributed and stays in a range of approximately ⅙ of the wavelength of the quasi-electrostatic field. Typically, in electromagnetism, the boundary between the near field and the far field is $\lambda/2\pi$. With approximately ⅙ of the wavelength as the boundary, the electric field component increases and the magnetic field component decreases in the range of approximately ⅙ of the wavelength. For example, in the case of electromagnetic waves with a frequency of 10 MHz, ⅙ of the wavelength (also referred to as ⅙ wavelength) is approximately 5 m, and accordingly the electric field component increases (and the magnetic field component decreases) within this range. A frequency of 10 MHz can be considered as a frequency suitable for electric field communication in a range of approximately 5 m which is ⅙ of the wavelength because the electric field component increases. Likewise, a frequency of 20 MHz can be considered as a frequency suitable for electric field communication in a range of approximately 2.5 m which is ⅙ of the wavelength because the electric field component increases.

For example, suppose the human height is 1.7 m. Then, the human body is sufficiently smaller than the ⅙ wavelength (approximately 5 m) of electromagnetic waves with a frequency of 10 MHz. Hence, electromagnetic waves with a frequency of 10 MHz cling to the human body like static electricity, because the electric field component increases (and the magnetic field component decreases). In the case of electromagnetic waves with a frequency of 400 MHz (e.g. digital simplicity radio), ⅙ of the wavelength is approximately 12 cm, which is sufficiently smaller than the human body. Hence, electromagnetic waves with a frequency of 400 MHz radiate like typical radio waves (electromagnetic waves), because not only the electric field component but also the magnetic field component increases. For example, in the case where the frequency of the quasi-electrostatic field generated around the mobile body 2 by the electric field generator 12 is 1 MHz, the wavelength is approximately 300 m, and the quasi-electrostatic field can be distributed and stay in a range of approximately 50 m which is ⅙ of approximately 300 m from the mobile body 2. In the case where the frequency of the quasi-electrostatic field generated around the mobile body 2 by the electric field generator 12 is 20 MHz, the quasi-electrostatic field can be distributed and stay in a range of approximately 2.5 m from the mobile body 2. Thus, by changing the output or frequency of the electric field generated, the electric field generator 12 can change the range in which the electric field is generated.

The electric field detector 13 detects the electric field. The electric field detector 13 may include an electrode 13A for detecting information such as the electric field intensity and frequency spectrum of the electric field. The electric field detector 13 may detect a change of the electric field based on a change of the information detected by the electrode 13A. The electrode 13A in the electric field detector 13 may be installed on the outer surface of the mobile body 2, in order to measure the change of the electric field generated around the mobile body 2 by the electric field generator 12.

The electric field detector 13 may include a plurality of electrodes 13A installed at different positions in the mobile body 2. For example, the plurality of electrodes 13A may each be installed at a different one of the front, back, and sides of the mobile body 2. The electric field detector 13 may transmit the change of the information such as the electric field intensity and frequency spectrum of the electric field detected by the plurality of electrodes 13A, to the controller 10 as the change of the electric field.

The electrode 13A in the electric field detector 13 may have directivity in a direction in which the information is detected. For example, a magnetic sheet or the like may be attached to at least one surface of the electrode 13A, to cause the electric field detector 13 to detect only information of the change of the electric field in a direction opposite to the surface to which the magnetic sheet is attached. Thus, for example, the controller 10 may specify the direction of the object 4 depending on which of the plurality of electrodes 13A included in the electric field detector 13 detects the change of the electric field.

The electric field detector 13 may include a filter circuit such as a low pass filter and a high pass filter. This enables the electric field detector 13 to detect only a change of an electric field of a specific frequency. Hence, the electric field detector 13 can more accurately detect the change of the electric field generated by the electric field generator 12, by blocking noise generated by the engine, another electronic device, etc. of the mobile body 2.

The electric field generator 12 and the electric field detector 13 may communicate with another information processing device via the quasi-electrostatic field, based on control by the controller 10. Specifically, having received an instruction to transmit information from the controller 10, the electric field generator 12 changes the quasi-electrostatic field generated, and transmits the information. Thus, in the case where another information processing device exists in the distribution range of the quasi-electrostatic field generated by the electric field generator 12, the other information processing device can receive the information from the electric field generator 12. Moreover, in the case where the distribution ranges of the respective quasi-electrostatic fields generated by the electronic device and the other information processing device overlap at least partially, the other information processing device can receive the information from the electric field generator 12.

The electric field detector 13 may detect a change of the quasi-electrostatic field generated by the other information processing device, and receive information from the other information processing device. The electric field detector 13 directly detects the change of the quasi-electrostatic field generated by the other information processing device, or detects the change of the quasi-electrostatic field generated by the other information processing device via the quasi-electrostatic field generated by the electronic device 1. The electric field detector 13 may transmit the detected change of the electric field to the controller 10, as a signal received from the other information processing device.

The communication interface 14 communicates with any information processing device, based on control by the controller 10. The communication interface 14 may include, for example, a wired local area network (LAN) communication module, a wireless LAN communication module, a controller area network (CAN) communication module, or a mobile body communication module such as 4G (4th generation) or 5G (5th generation). The communication between the electronic device 1 and any information processing device through the communication interface 14 may be wired or wireless communication, or a combination thereof. Examples of the information processing device include a control device, an in-vehicle device, a car navigation system, and the like installed in the mobile body 2. For example, the communication interface 14 may transmit the below-described signal for controlling the mobile body 2, to the control device in the mobile body 2 via a CAN communication network of the mobile body 2.

The power source 15 supplies power used for the operation of the electronic device 1. The power source 15 may be, for example, a dry cell or a storage cell. For example, the power source 15 may include an adapter for receiving power supply from an external power source such as a battery of the moving body 2, and be supplied with power from the external power source.

The notification interface 16 notifies information by sound, vibration, light, an image, or the like, based on control by the controller 10. For example, the notification interface 16 may include at least one of a speaker, a vibrator, a lamp, and a display device. The notification interface 16 may notify the distribution range of the electric field generated by the electric field generator 12, whether the object 4 exists in the distribution range of the electric field, and the like, based on control by the controller 10. For example, in the case where the electric field detector 13 detects the change of the electric field, the notification interface 16 may notify the user of the detection of the object 4 by outputting sound or lighting the lamp.

The input interface 17 receives an input operation from the user. For example, the input interface 17 may include at least one of: physical keys such as a power button; an input device such as a touch panel; a pointing device such as a mouse; and a microphone for receiving voice input. When operated by the user, the input interface 17 transmits the input operation to the controller 10 as electronic information. Examples of the input operation include an instruction to start an operation of detecting the object 4.

The controller 10 controls each function in the electronic device 1 in the following manner. The controller 10 causes the electric field generator 12 to generate the electric field in the predetermined range. The controller 10 may control the frequency, output, etc. of the electric field generated by the electric field generator 12, to cause the quasi-electrostatic field to be distributed and stay in the predetermined range from the mobile body 2.

The controller 10 causes the electric field detector 13 to detect the electric field. For example, the controller 10 may repeat the detection of the electric field by the electric field detector 13 at predetermined timing. The predetermined timing may be predetermined time intervals. The controller 10 may, for example, take a result of comparing information such as the electric field intensity and frequency spectrum of the electric field detected by the electrode 13A at two or more points in time, as the change of the electric field detected by the electric field detector 13.

The controller 10 detects the object 4 in the predetermined range, based on the change of the electric field detected by the electric field detector 13. The controller 10 may store a predetermined threshold in the memory 11 beforehand. In the case where the change of the electric field detected by the electric field detector 13 is greater than the predetermined threshold, the controller 10 may determine that the object 4 exists in the predetermined range from the mobile body 2. In the case where the change of the electric field detected by the electric field detector 13 is not greater than the predetermined threshold, the controller 10 may determine that the object 4 does not exist in the predetermined range from the mobile body 2.

The controller 10 may determine the distance between the object 4 and the mobile body 2, based on the change of the electric field detected by the electric field detector 13. For example, in the case where the value of electric field intensity measured by the electric field detector 13 increases, the controller 10 may determine that the distance between the object 4 and the mobile body 2 increases. For example, in the case where the value of electric field intensity measured by the electric field detector 13 decreases, the controller 10 may determine that the distance between the object 4 and the mobile body 2 decreases. If a substance is present in the electric field, free electrons in the substance move in the direction of the electric field, as a result of which polarization occurs at both ends of the substance. An electric field generated by this polarization acts in a direction of canceling the existing electric field. Thus, when the distance between the object 4 and the mobile body 2 decreases, the electric field intensity decreases.

In the case where the electric field detector 13 includes a plurality of electrodes 13A installed at different positions in the mobile body 2, the controller 10 may detect the object 4 in the predetermined range based on the change of the electric field detected by each of at least two electrodes 13A from among the plurality of electrodes 13A. The controller 10 may not only determine whether the object 4 exists in the predetermined range from the mobile body 2 but also determine the position of the object 4 such as the distance and direction from the mobile body 2 to the object 4, based on the difference between the respective electric fields detected by the plurality of electrodes 13A.

The controller 10 controls the mobile body 2 based on the result of detecting the object 4. The controller 10 may perform any control on the mobile body 2. The control of the mobile body 2 by the controller 10 may be intended for full or partial automatic driving of the mobile body 2, or intended for assisting the driver in driving the mobile body 2. For example, in the case where the controller 10 detects the object 4 in the predetermined range from the mobile body 2, the controller 10 may decrease the moving speed of the mobile body 2, or steer the mobile body 2 to change the direction of travel. Alternatively, in the case where the controller 10 detects the object 4 in the predetermined range from the mobile body 2, the controller 10 may cause the notification interface 16 to display the detection of the object 4. The controller 10 may be communicably connected to the control device, the in-vehicle device, etc. in the mobile body 2 via the CAN communication network of the mobile body 2. For example, the controller 10 may directly control the accelerator, brake, steering, etc. of the mobile body 2. Alternatively, the controller 10 may indirectly control the mobile body 2 by transmitting a control signal for controlling the mobile body 2 from the communication interface 14 to the control device in the mobile body 2.

The controller 10 may change the range in which the electric field is generated by the electric field generator 12, based on the result of detecting the object 4. For example, in the case where the controller 10 detects the object 4 in the predetermined range from the mobile body 2, the controller 10 may narrow the range of the electric field generated by the electric field generator 12. In this way, the controller 10 can more accurately determine the position of the object 4 such as the distance and direction from the mobile body 2 to the object 4. In the case where the controller 10 does not detect the object 4 in the predetermined range from the mobile body 2, the controller 10 may widen the range of the electric field generated by the electric field generator 12. In this way, the controller 10 can detect the object 4 in a wider range.

The controller 10 may change the electric field generated by the electric field generator 12 and transmit information to another information processing device, based on the result of detecting the object 4. For example, in the case where the controller 10 detects the object 4 in the predetermined range from the mobile body 2, the controller 10 may change the quasi-electrostatic field generated by the electric field generator 12 and transmit a signal notifying the detection of the object 4 to the other information processing device. Alternatively, the controller 10 may transmit the signal to the object 4. In the case where the controller 10 does not detect the object 4 in the predetermined range from the mobile body 2, the controller 10 may change the quasi-electrostatic field generated by the electric field generator 12 and transmit, to the other information processing device, a signal notifying that the object 4 is not detected.

An example of operation performed by the electronic device 1 according to one of the disclosed embodiments will be described below, with reference to FIGS. 3 and 4.

Figure 3:
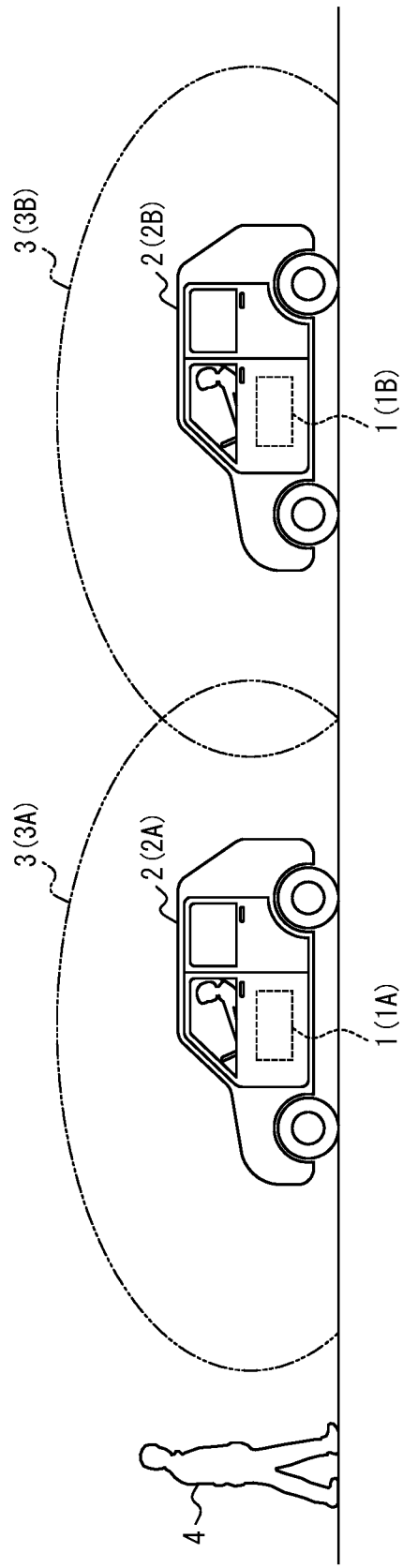
FIG. 3 is a diagram illustrating flow of operation of the electronic device according to one of the disclosed embodiments.
Figure 4:
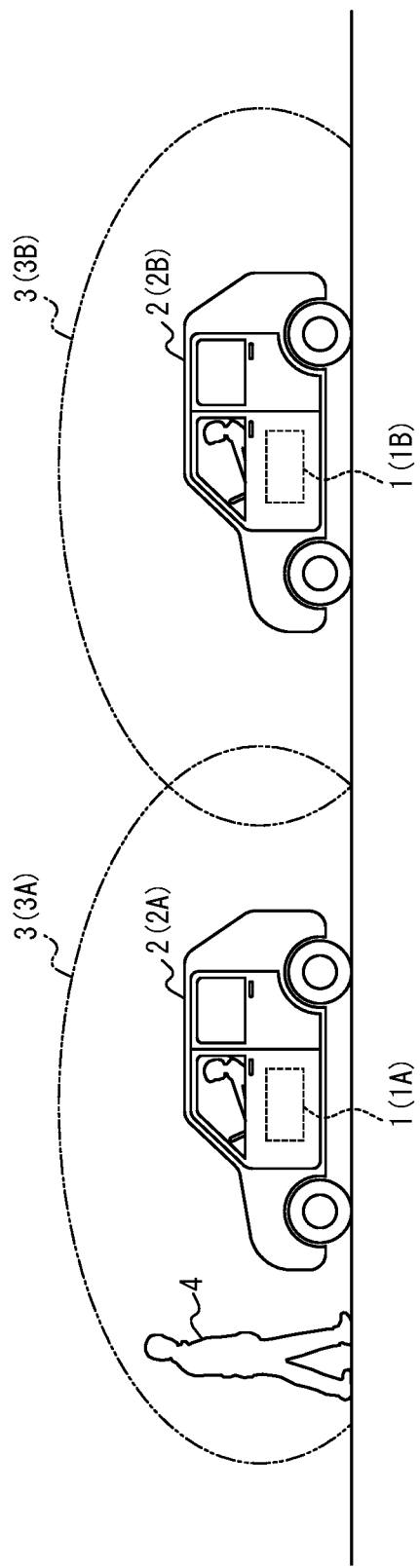
FIG. 4 is a diagram illustrating flow of operation of the electronic device according to one of the disclosed embodiments.

FIGS. 3 and 4 illustrate a mobile body 2A in which an electronic device 1A is installed and a mobile body 2B in which an electronic device 1B is installed. The mobile bodies 2A and 2B may be included in a plurality of mobile bodies 2 that perform platooning. In FIG. 3, the mobile body 2A is running with a quasi-electrostatic field being generated in a predetermined distribution range 3A from the electronic device 1A. The mobile body 2B is running with a quasi-electrostatic field being generated in a predetermined distribution range 3B from the electronic device 1B. The electronic devices 1A and 1B have the distribution ranges 3A and 3B of their quasi-electrostatic fields overlapping at least partially, and therefore can communicate with each other via the quasi-electrostatic fields. At a first point in time illustrated in FIG. 3, an object 4 such as a pedestrian is not in the distribution range 3A of the quasi-electrostatic field generated by the electronic device 1A and the distribution range 3B of the quasi-electrostatic field generated by the electronic device 1B. Accordingly, the electronic device 1A determines that the object 4 does not exist in the predetermined range from the mobile body 2A, and continues the running of the mobile body 2A. The electronic device 1B determines that the object 4 does not exist in the predetermined range from the mobile body 2B, and continues the running of the mobile body 2B. The electronic devices 1A and 1B may transmit a signal notifying that the object 4 is not detected, to each other.

At a second point in time illustrated in FIG. 4, the object 4 is in the distribution range 3A of the quasi-electrostatic field generated by the electronic device 1A. In such a case, as a result of the mobile body 2A running, the relative distance between the object 4 and the electronic device 1A changes, and the quasi-electrostatic field in the distribution range 3A changes. Based on the change of the quasi-electrostatic field in the distribution range 3A, the electronic device 1A detects the object 4 in the predetermined range from the mobile body 2A, and decreases the running speed of the mobile body 2A. The electronic device 1A also transmits a signal notifying the detection of the object 4 to the electronic device 1B via the quasi-electrostatic field. The electronic device 1B, which has continued the running of the mobile body 2B without detecting the object 4, can decrease the running speed of the mobile body 2B upon receiving the signal notifying the detection of the object 4 from the electronic device 1A.

(Example of Processing by Electronic Device)

Flow of processing by the electronic device 1 according to one of the disclosed embodiments will be described below, with reference to FIG. 5. The process illustrated in FIG. 5 may be started based on any condition such as the input interface 17 receiving a user operation or the electronic device 1 being started.

Step S101: The controller 10 causes the electric field generator 12 to generate an electric field in a predetermined range from the mobile body 2.

Step S102: The controller 10 causes the electric field detector 13 to detect a change of the electric field. In the case where the electric field detector 13 includes a plurality of electrodes 13A installed at different positions in the mobile body 2, the controller 10 may detect the change of the electric field detected by at least two electrodes 13A from among the plurality of electrodes 13A.

Step S103: The controller 10 detects the object 4 in the predetermined range from the mobile body 2, based on the detected change of the electric field.

Step S104: The controller 10 controls the mobile body 2 based on the result of detecting the object 4.

Step S105: The controller 10 changes the range of generation by the electric field generator 12, based on the result of detecting the object 4.

Step S106: The controller 10 changes the electric field generated by the electric field generator 12 and transmits information to another information processing device, based on the result of detecting the object 4. Steps S104, S105, and S106 may be selectively performed.

Step S107: The controller 10 determines whether to continue the process. In the case of continuing the process (step S107: Yes), the controller 10 repeats the process from step S102. In the case of not continuing the process (step S107: No), the controller 10 ends the process.

As described above, the electronic device 1 according to this embodiment is installed in the mobile body 2. The electronic device 1 includes the electric field generator 12, the electric field detector 13, and the controller 10. The electric field generator 12 generates an electric field in a predetermined range. The electric field detector 13 detects the electric field generated by the electric field generator 12. The controller 10 detects the object 4 in the predetermined range, based on a change of the electric field detected by the electric field detector 13. The controller 10 controls the mobile body 2 based on the result of detecting the object 4. With such a structure, the technique of detecting an object using an electric field can be used for automatic driving, automatic control, etc. of the mobile body 2. Thus, the usefulness of the technique of detecting an object using an electric field can be improved.

The electric field detector 13 in the electronic device 1 according to this embodiment may include a plurality of electrodes 13A installed at different positions in the mobile body 2. The controller 10 may detect the object in the predetermined range, based on the change of the electric field detected by at least two electrodes 13A from among the plurality of electrodes 13A. With such a structure, the electronic device 1 can not only determine whether the object 4 exists in the predetermined range from the mobile body 2 but also determine the position of the object 4 such as the distance and direction from the mobile body 2 to the object 4.

The controller 10 in the electronic device 1 according to this embodiment may change the range of the electric field generated by the electric field generator 12, based on the result of detecting the object 4. With such a structure, in the case where the object 4 is detected, the controller 10 can narrow the range of detecting the object 4 using the electric field to increase the accuracy of detecting the object 4. In the case where the object 4 is not detected, the controller 10 can widen the detection range. Thus, the usefulness of the technique of detecting an object using an electric field can be improved.

The controller 10 in the electronic device 1 according to this embodiment may change the electric field generated by the electric field generator 12 and transmit information to another information processing device, based on the result of detecting the object 4. With such a structure, the controller 10 can not only detect the object 4 but also notify another information processing device of, for example, the presence or absence of the object 4 via the electric field. This contributes to lower cost than in the case where the detection of the object 4 and the communication with another information processing device are performed by different devices. Thus, the usefulness of the technique of detecting an object using an electric field can be improved.

While some embodiments and examples of the present disclosure have been described above by way of drawings, various changes and modifications may be easily made by those of ordinary skill in the art based on the present disclosure. Such changes and modifications are therefore included in the scope of the present disclosure. For example, the functions included in the functional parts, etc. may be rearranged without logical inconsistency, and a plurality of functional parts, etc. may be combined into one functional part, etc. and a functional part, etc. may be divided into a plurality of functional parts, etc. Moreover, each of the disclosed embodiments is not limited to the strict implementation of the embodiment, and features may be combined or partially omitted as appropriate. That is, various changes and modifications may be made to the presently disclosed techniques by those of ordinary skill in the art based on the present disclosure. Such changes and modifications are therefore included in the scope of the present disclosure. For example, functional parts, means, steps, etc. in each embodiment may be added to another embodiment without logical inconsistency, or replace functional parts, means, steps, etc. in another embodiment. In each embodiment, a plurality of functional parts, means, steps, etc. may be combined into one functional part, means, step, etc., and a functional part, means, step, etc. may be divided into a plurality of each functional parts, means, steps, etc. Moreover, each of the disclosed embodiments is not limited to the strict implementation of the embodiment, and features may be combined or partially omitted as appropriate.

For example, although the above describes the case where the electric field generated in the predetermined range from the mobile body 2 by the electric field generator 12 is a quasi-electrostatic field, the presently disclosed techniques are not limited to such. For example, the electric field may be an electrostatic field. In such a case, the communication interface 14 may transmit information to another information processing device through mobile body communication such as 4G or 5G.

The foregoing embodiments are not limited to implementation as the electronic device 1. For example, the foregoing embodiments may be implemented as a control method of a device such as the electronic device 1. For example, the foregoing embodiments may be implemented as a control program of a device such as the electronic device 1.

The invention claimed is:

1. An electronic device configured to be installed in a mobile body, the electronic device comprising:
   an electric field generator configured to generate an electric field in a predetermined range;
   an electric field detector configured to detect the electric field generated by the electric field generator; and
   a controller configured to detect an object in the predetermined range based on a change of the electric field detected by the electric field detector, and control the mobile body based on a result of detecting the object, wherein when the object is detected in the predetermined range, the controller changes the electric field generated by the electric field generator to transmit a signal notifying a detection of the object to an other information processing device via the electric field.

2. The electronic device according to claim 1, wherein the electric field detector includes a plurality of electrodes installed at different positions in the mobile body, and the controller is configured to detect the object in the predetermined range, based on the change of the electric field detected by at least two electrodes from among the plurality of electrodes.

3. The electronic device according to claim 1, wherein the controller is configured to change the range in which the electric field is generated by the electric field generator, based on the result of detecting the object.

4. A control method of an electronic device installed in a mobile body, the control method comprising:

generating an electric field in a predetermined range;

detecting the electric field generated;

detecting an object in the predetermined range based on a change of the electric field detected;

controlling the mobile body based on a result of detecting the object; and when the object is detected in the predetermined range, changing the electric field generated to transmit a signal notifying a detection of the object to an other information processing device via the electric field.

5. A control program of an electronic device installed in a mobile body, the control program causing the electronic device to:

generate an electric field in a predetermined range;

detect the electric field generated;

detect an object in the predetermined range based on a change of the electric field detected;

control the mobile body based on a result of detecting the object; and when the object is detected in the predetermined range, change the electric field generated to transmit a signal notifying a detection of the object to an other information processing device via the electric field.

* * * * *